United States Patent [19]

Mueller

[11] Patent Number: 5,391,850
[45] Date of Patent: Feb. 21, 1995

[54] APPARATUS AND METHOD FOR FAST HOLE DRILLING BY ELECTRICAL DISCHARGE MACHINING

[75] Inventor: Rainer L. Mueller, Plymouth, Mich.

[73] Assignee: Ford Motor Company, Dearborn, Mich.

[21] Appl. No.: 188,009

[22] Filed: Jan. 28, 1994

[51] Int. Cl.⁶ .......................... B23H 1/00; B23H 9/14
[52] U.S. Cl. .................. 219/69.2; 219/69.11; 219/69.14
[58] Field of Search .............. 219/69.11, 69.14, 69.15, 219/69.2, 69.17

[56] References Cited

U.S. PATENT DOCUMENTS

| | | | |
|---|---|---|---|
| 2,778,925 | 1/1957 | Gross et al. | 219/69.15 |
| 2,909,640 | 10/1959 | Fairbrother | 219/69.15 |
| 3,230,412 | 1/1966 | Webb | 314/61 |
| 3,289,029 | 11/1966 | Webb | 314/61 |
| 3,390,244 | 6/1968 | Webb | 219/69.14 |
| 3,609,279 | 9/1971 | Giesbrecht et al. | 219/69.16 |
| 3,662,142 | 5/1972 | Olsson | 219/69.16 |
| 3,806,691 | 4/1974 | Roach | 219/69.2 |
| 4,107,504 | 8/1978 | Dinsdale | 219/69.15 |
| 4,527,035 | 7/1985 | Majestic | 219/69.14 |
| 4,629,854 | 12/1986 | Inoue et al. | 219/69.14 |
| 4,721,839 | 1/1988 | Dzewaltowski et al. | 219/69.17 |
| 4,751,361 | 6/1988 | Inoue et al. | 219/69.12 |

FOREIGN PATENT DOCUMENTS

| | | | |
|---|---|---|---|
| 60-263627 | 12/1985 | Japan | 219/69.11 |
| 63-312023 | 12/1988 | Japan | 219/69.11 |
| 4-111721 | 4/1992 | Japan | 219/69.14 |
| 1662781 | 7/1991 | U.S.S.R. | 219/69.15 |

*Primary Examiner*—Geoffrey S. Evans
*Attorney, Agent, or Firm*—Roger L. May; Joseph W. Malleck

[57] ABSTRACT

An apparatus and method for fast hole drilling by electrical discharge machining. The apparatus includes an indexable table (12) and a rigid vertical frame (14) which straddles the table (12). A slide member (16) is cooperatively attached to the frame (14) so that it may move in relation thereto. A plurality of advancable and retractable heads (18, 20, 22) are associated with the slide member (16) and are adaptable for electrical discharge machining. Each head (18, 20, 22) is adjustably inclinable in a plane which lies parallel to the slide member (16). Each head (18, 20, 22) includes a rotatable, hollow electrode (24) defining an axially extending channel (28). A dielectric fluid (50) passes along the channel (28) so that machining debris may be transported away from a workpiece (11) and drilling operation may proceed in a force-free, non-contacting manner.

12 Claims, 4 Drawing Sheets

_5,391,850_

APPARATUS AND METHOD FOR FAST HOLE DRILLING BY ELECTRICAL DISCHARGE MACHINING

TECHNICAL FIELD

This invention relates to an apparatus and method for utilizing electrical discharge machining technology to drill holes with rapidity.

BACKGROUND ART

Today's need for smaller and more fuel efficient automobiles stimulates automobile manufacturers and their competitors to produce faster and lighter engines and transmissions. This translates into a need for better lubrication of critical high speed rotating components in both engines and transmissions.

To accomplish this, product engineers are designing transmission components with many new small and deep hole lubrication circuits to provide oil to delicate high speed bearings. Faced with the challenge of making these holes, manufacturing engineers have been called upon to reinvent deep hole drilling, especially for small holes, which are typically one and a half millimeters or less in diameter and five to ten times that in depth.

Conventional twist drilling of such holes, although not difficult in low volume applications, has traditionally been avoided for high volume production applications because of the limited drill life of small diameter drills. Twist drilling deep, small diameter holes has been impractical and inefficient for typical high volume automotive production applications.

Against this background, the need has arisen to investigate alternative small hole-making process technologies, such as those required to drill crankshaft lube holes in engines under development at high production volumes.

The three most common hole drilling technologies are twist drilling, gun drilling and electrical discharge machining (EDM). Conventional twist drilling of small diameter holes has traditionally been avoided in a high volume environment because of limited drill life. Conventional electrical discharge machining does provide a small hole-making alternative to drilling, but the process is generally too slow for high volume production applications. Accordingly, the need has arisen for a technique to increase cutting speed by an order of magnitude, thereby providing a potentially viable alternative to conventional drilling techniques.

In an effort to compare the different drilling technologies, comparative data has been collected. Information has been gathered from manufacturing operations using a transmission output shaft as a typical example of a high volume part with a variety of holes requiring numerous drilling operations. This part has both shallow and deep holes produced conventionally with both twist and gun drilling operations. It also has a small, 1.2 millimeter diameter hole, which currently is twist drilled. Two additional 1.0 millimeter diameter lube holes were added to this part for a high load truck application.

Until the present work, there remained an unfulfilled requirement providing a cost-effective alternative to conventional drilling.

As an example of unfulfilled need, product engineers have wished to add small lubrication holes to power train components to reduce friction and improve the durability of engines and transmissions. Manufacturing engineers, on the other hand, have not, until the present invention, had a cost effective, robust process available with which to produce such small holes.

SUMMARY OF THE INVENTION

Electrical discharge machining is sometimes also referred to as spark erosion. In this process, electricity passed through an electrode in the shape of the desired cavity is used to erode a cavity in an electrically conductive workpiece. Erosion occurs by passing a series of relatively low voltage, high current, high frequency, localized discharges across a small gap between the electrode and the workpiece in the presence of a dielectric fluid.

EDM Fast Hole Drilling is a relatively new and emerging technology for drilling deep small holes.

The apparatus and method of the present invention is used to drill holes in a workpiece by this electrical discharge machining technique. The apparatus comprises an indexable table, and a rigid vertical frame which straddles the table. A slide member is cooperatively attached to the frame. The slide member may move in relation thereto.

Associated with the slide member is a plurality of advancable and retractable heads that are adapted for electrical discharge machining. Each head is adjustable and inclinable in a plane which lies parallel to the slide member. Each head includes a rotatable, hollow electrode defining an axially extending channel therethrough. Each electrode is securable in relation to the associated head.

The apparatus of the present invention also includes means for delivering a dielectric fluid through the channel so that machining debris may be transported away from the workpiece.

DETAILED DESCRIPTION OF THE INVENTION

DETAILED DESCRIPTION OF THE INVENTION

Figure 1:
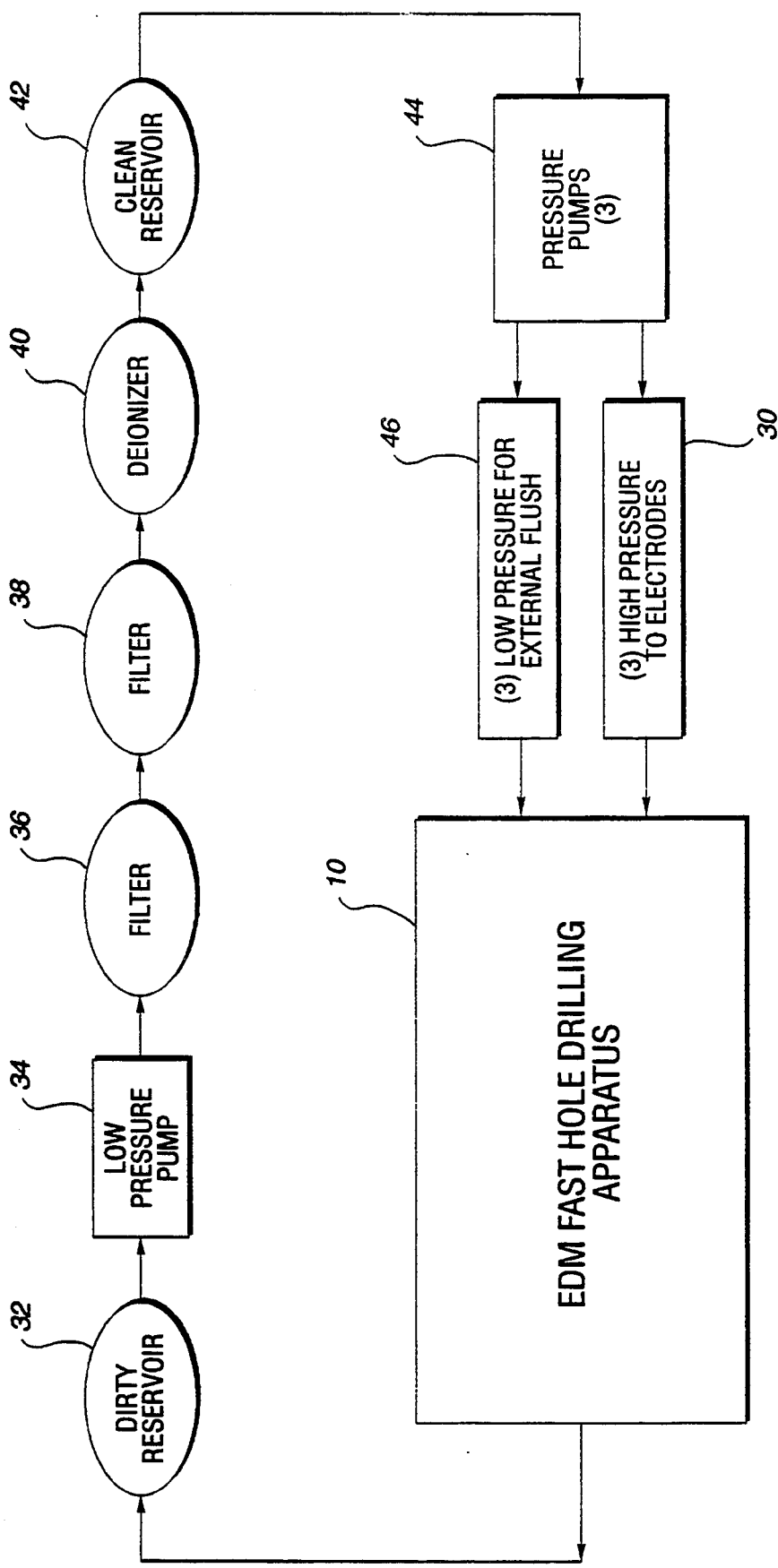
FIG. 1 is a schematic diagram of a dielectric flow path into, through, and from an electrical discharge machine (EDM) according to the present invention.
Figure 2:
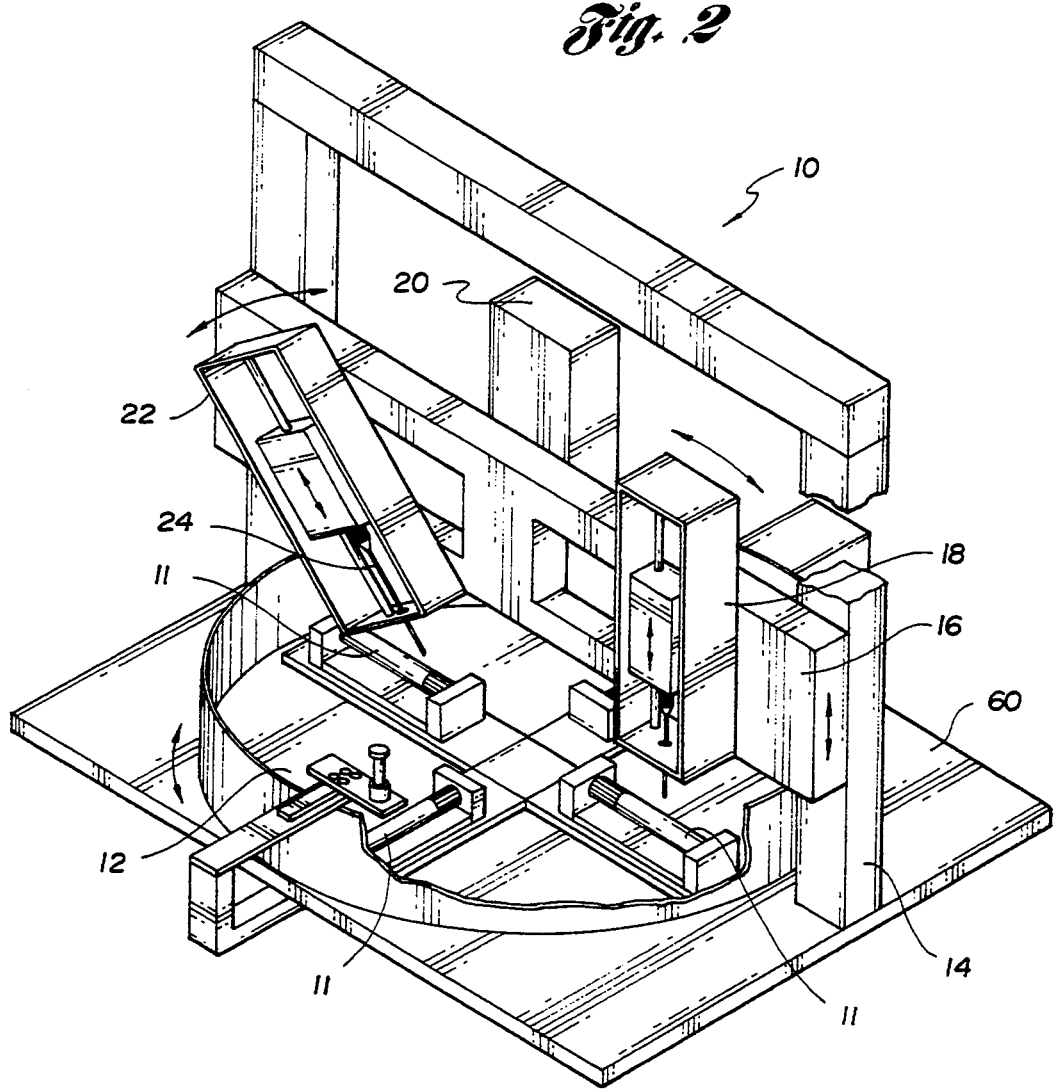
FIG. 2 is a front perspective view of the EDM machine of the present invention.
Figure 3:
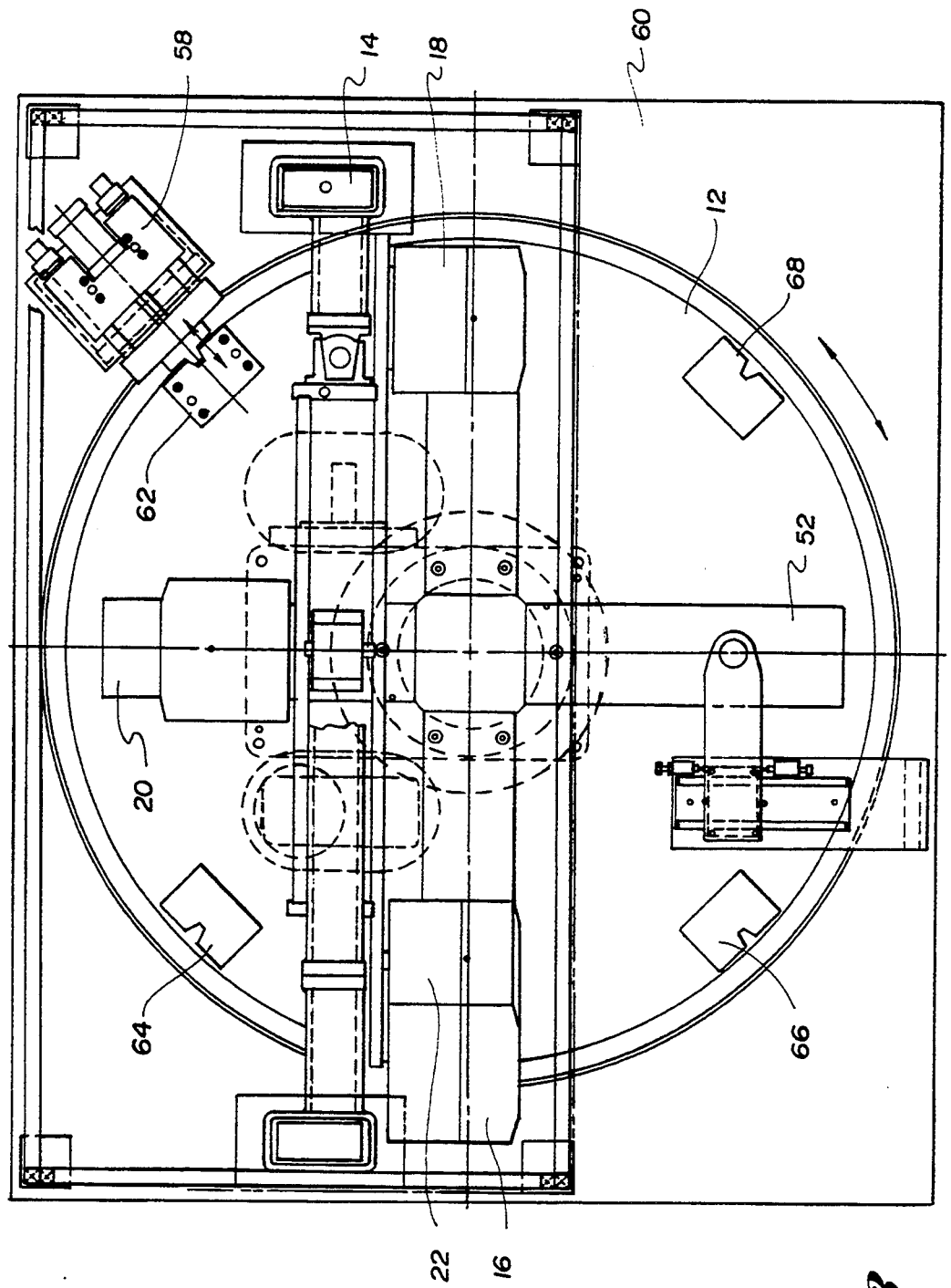
FIG. 3 is a top view thereof.

Turning first to FIGS. 1-3, there is depicted an apparatus 10 for drilling holes in a workpiece 11 (FIG. 2) by electrical discharge machining. In FIGS. 2-3, three workpieces, each depicted by the reference numeral 11, are shown. The apparatus 10 includes an indexable table 12 which is disposed within a rigid vertical frame 14 which straddles the table 12. A slide member 16 (FIG. 2) is cooperatively attached to the frame so that it may move in relation thereto.

Associated with the slide member 16 is a plurality of advancable and retractable heads 18, 20, 22 (FIGS. 2-3) which are adapted for electrical discharge machining.

Each head 18, 20, 22 is adjustable and inclinable in a plane which lies parallel to the slide member 16.

Figure 4:
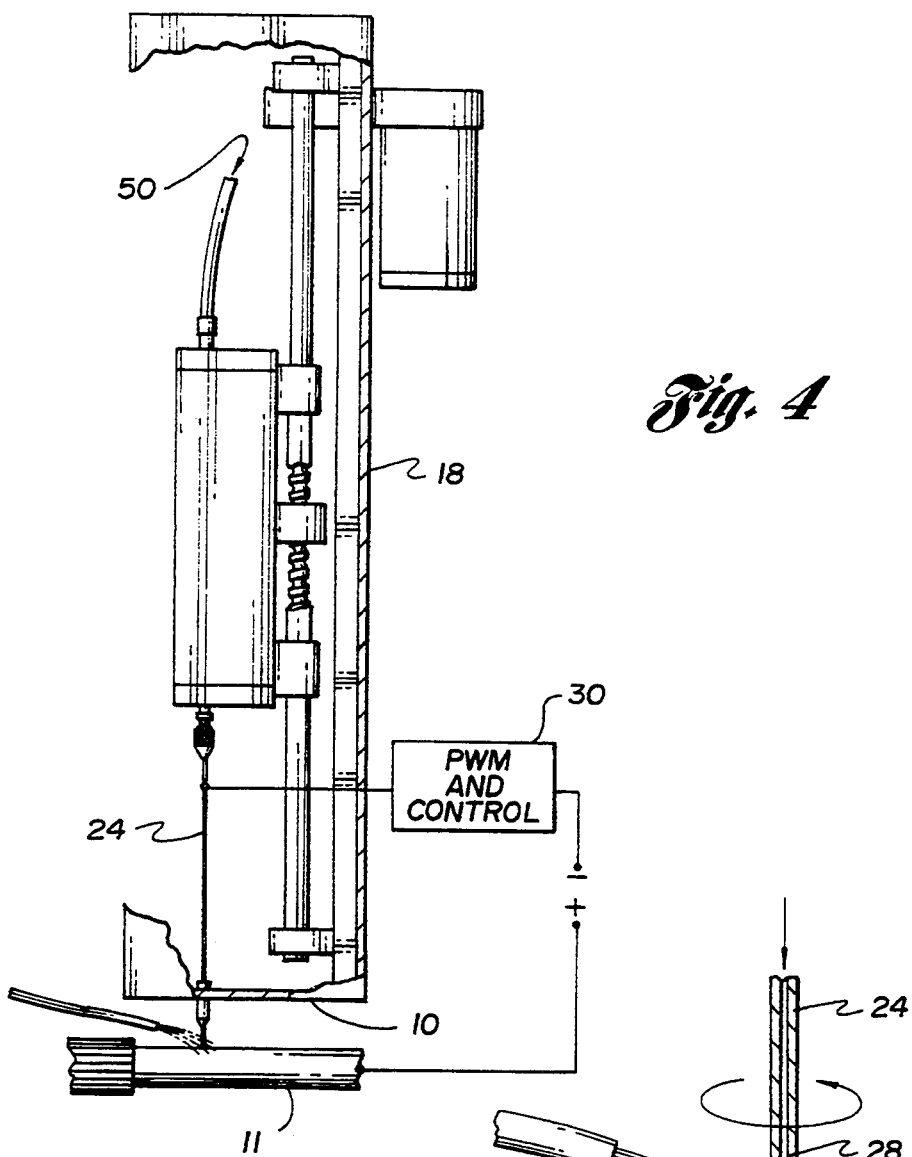
FIG. 4 is a side view thereof.
Figure 5:
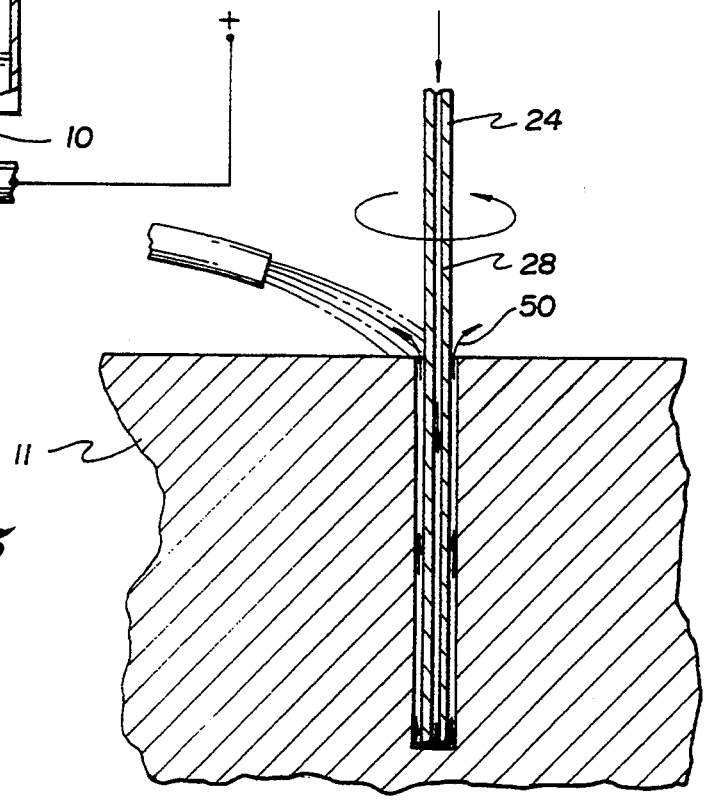
FIG. 5 is an enlarged view of a portion of FIG. 4 which depicts a rotating electrode through which the dielectric fluid flows and emerges between it and an electrically conductive workpiece, in which a fine bore hole is created with rapidity according to the present invention.

Included in each head 18, 20, 22 is a rotatable hollow electrode, one of which is depicted in FIG. 2 with a reference numeral 24. With particular reference to FIGS. 4-5, each rotatable, hollow electrode such as that depicted with the reference numeral 24 defines an axially extending channel 28. Each electrode is securable in relation to the associated head.

Schematically depicted in FIGS. 4-5 is a means 30 for delivering a dielectric fluid 50 through a channel 28 so that machining debris may be transported away from the workpiece 11.

The dielectric fluid delivery means 30 (labelled in FIG. 4 as "PWM and control"); includes high pressure devices which are connected to the electrodes which, in the embodiment depicted, number three. FIG. 1 is helpful in disclosing other aspects of the delivery means. As dielectric fluid emerges from the EDM Fast Hold Drilling apparatus 10, it enters a dirty reservoir 32 before flowing into a lower pressure pump 34, and thence through filters 36, 38 to a deionizer 40 before entering a clean reservoir 42. Thence, modified dielectric fluid enters three pressure pumps collectively designated in FIG. 1 by the reference numeral 44. One pressure pump is associated with one electrode. From the pressure pumps 44, pressurized dielectric fluid enters three high pressure devices 30, each of which delivers dielectric fluid into a channel 28 (FIG. 5) of a rotating electrode. In addition, three low pressure devices 46 flush dielectric fluid from the workpiece surface adjacent the exterior of a rotating electrode.

Before proceeding with additional detail of the preferred embodiments, it may be helpful to discuss differences between conventional EDM drilling and the Fast Hole EDM drilling techniques which are the subject of the present invention. Such differences include the following:

1. Fast Hole EDM drilling uses a rotating electrode, as opposed to a fixed electrode used in conventional EDM drilling.
2. The electrode in Fast Hole EDM drilling is a tube, as opposed to a solid wire electrode used in conventional EDM drilling.
3. A dielectric fluid is pumped through the tube electrode in fast hole EDM, as opposed to external flushing of the electrode, or electrode immersion in conventional EDM.

The combination of these differences creates an extremely efficient removal of the effluent or machining swarf from the operation, resulting in fast hole EDM feed rates of up to 10 times as fast as conventional EDM. Drilling rates up to two inches per minute are now possible with the disclosed process, making it a cost-effective solution to high volume production needs.

EDM Fast Hole Drilling has the following benefits over conventional twist or gun drilling in holes of comparable size:

1. No center drilling or end milling is required prior to hole drilling, as is generally required in conventional drilling of small holes. Sometimes both end milling and center drilling is required prior to hole drilling depending on the application.
2. No deburring is required after the drilling operation, as is almost always the case with conventional drilling.
3. Parts can be drilled with EDM Fast Hole Drilling prior to, or after being hardened, offering improvements in part quality and machining system flexibility.
4. Facility costs are relatively low compared to conventional drilling systems.

The EDM Fast Hole system is relatively inexpensive to facilitate. Work is continuing in refining this technology to permit automatic changing of electrodes, and to reduce the electrode consumption rate. Also, work on the fundamentals of electrical discharge machining have been undertaken to make this technology viable for larger holes.

In accordance with the present invention, a need was identified to produce burr-free holes in an automotive part and avoid subsequent costly deburring operations to the internal cavities with which the holes intersect.

The inventor has integrated three "fast hole" EDM drill spindles into a four-station rotary table machine (FIG. 3) designed to create two 0.040" holes and a 0.050" hole approximately 0.180" deep. The machine produces a part every 25 seconds—automatically.

Turning now to FIG. 3, the cycle begins with an operator unloading a finished part and then loading and orienting a new part at the first station 52. The operator then starts the machine cycle. The table indexes 90° and each of the three EDM heads or spindles 18, 20, 22 operate simultaneously on three different parts. While the drilling is taking place, the operator can be loading and unloading another part. When the drilling is complete, the machine indexes and another finished part is presented to the operator as the new part is rotated to the first station 52.

Turning now to FIG. 4, there is depicted an EDM head 18 with a servo-controlled slide affixed thereto which enables an electrode 24 to advance or retract in relation to the workpiece 11. The dielectric fluid 50 may pass from a high pressure delivery device 30 (FIG. 1) into a rotary hydraulic coupling and thence to a chuck from which the electrode tube 24 protrudes before it passes through the guide plate 70. A guide bushing is deployed below the guide plate 70. One way of operating the depicted apparatus is to connect the associated electrical circuitry so that a negative pole is produced at the electrode 24, and a positive pole is created at the workpiece 11. This may also be reversed, depending on desired objectives.

In FIG. 5, the dielectric fluid path 28 is defined axially through the rotating electrode 24. Preferably, in the apparatus depicted in FIGS. 2-3, two electrodes have a 1.0 mm outside diameter, while a third electrode has a 1.2 mm outside diameter. Preferably, each channel 28 has an internal diameter of 0.1-0.15 mm. Typically, the clearance between the outer diameter of the electrode 24 and the inside diameter of the bore generated in workpiece 11 represents about 0.011 inches in clearance. Thus, the hole generated in the workpiece 11 is approximately 0.055 mm larger than the electrode.

The machine utilizes the high pressure pump 30 (FIG. 1) to provide additional external flushing which assists breakout and keeps the part fixturing clean. Although the three heads operate independently, they all move on the common slide member 16 ram to facilitate simultaneous changing of electrodes, and clearance for table indexing.

The machine uses brass electrodes which produce 70 holes before requiring changing. It is run 16 hours per day, five days a week producing 11,500 parts per week.

Production EDM machines must be justified against conventional drilling methods for speed, costs (tooling and manpower), quality, and reliability. More manufacturers are finding them acceptable based on the following reasons:

Drilling Problems. Drill breakage, burrs, drill walk or drift, and straight hole problems can be eliminated with EDM.

Production Speed. Depending on conditions, EDM can be faster than traditional drilling methods and does not require expensive fixturing or preparation such as spotfacing or center drilling. In addition, subsequent deburring operations can be eliminated.

Quality. Size, taper finish, recast and depth tolerances with EDM are controllable variables. However, speed and tool wear are also affected when these variables are controlled.

Manpower Costs. Automatic loaders, CNC controls and other auxiliary equipment are available for multi-hole or multi-part applications.

In one application, fast hole EDM was used to drill three small holes (two at 1.0 mm diameter and one at 1.2 mm diameter) in a transmission output shaft. Thrust bearings at the rear end of transmission output shafts require additional lubrication to survive long term durability testing. Accordingly, the three small holes were added to the output shaft to sling oil directly onto these bearings. The addition of the lubrication holes solved durability problems.

In light of the previous disclosure, it will be apparent that the disclosed technology may permit automatic changing of electrodes and opportunities to reduce the electrode consumption rate. Further, the disclosed technology may be viable for holes larger than 2 mm in diameter.

In one embodiment of the present invention, the disclosed EDM machine uses a high speed small hole EDM drilling unit manufactured by Mikuni Sogyo Corporation of Japan (Model ED-Alpha). That unit includes a power supply, a high pressure pump, and operator controls. A servo-control drill head 18 is mounted on a vertical slide 16. Accessories include water-soluble dielectric fluid concentrate (EX-01), pipe electrodes, electrode guides, and an electrode chuck. Operator inputs include EDM settings. Displays include the present access position and set depth. The typical machining current is 40 amps.

In light of the above disclosure, it will be apparent that the process operations performed at each head 18, 20, 22 is independent. Drilling operations are accomplished without the use of mechanical force. In this context, the disclosed operations are performed in a manner which is mechanically non-contacting.

Referring again to FIGS. 2-3, the indexable table 12 has one or more indexing blocks 62, 64, 66, 68 mounted around a periphery thereon. Each block is engageable with an index lock 58 which is firmly secured to a base 60. Thus, a table 20 may be predictably and securely oriented in its angular relationship to the base 60. This allows parts to be loaded and unloaded from the machine during the drill cycle, further reducing overall cycle time.

In the method of Claim 8 the EDM drilling step is accomplished at a feed rate of about 2 inches per minute under a DC open voltage in the range of 130-140 volts, which supplies a maximum current of about 20 amps delivered for about 10 micro seconds.

In the method of Claim 9, the current passing through the rotating electrode is between 13-16 amps.

In light of the previous disclosure, it will be apparent that the disclosed apparatus and method may be used on a workpiece which exhibits electrically conductive properties. Materials exhibiting such properties include copper, brass, aluminum, and certain ceramics, such as tungsten carbide. Details of the mechanical attachment of various members of the apparatus 10 have not been described in detail as they are considered within the purview of those having ordinary skill in the art. For example, it would be apparent that a ball screw and guide bars (FIG. 4) cooperate with the rotating electrode 24. As depicted in FIG. 4, the electrode 24 passes through a guide plate 70.

Additionally, it should be noted that the external flush feature described earlier is optional in the sense that it may be used as a supplemental irrigation method through the channel 28 of electrode 24, or may be suppressed. In that case, axial flow is the only fluid influence which may remove swarf from the workpiece 11. When external irrigation is used, excess pump capacity is deployed to flush the table 12 so that the apparatus 10 remains free of machining debris.

Continuing with reference to FIG. 4, a delivery means 30 includes an electrical apparatus which, for example, delivers control and pulse width modulation. Additional control circuitry is considered conventional. Thus, for brevity, it will not be described at length. Suffice it to say that the disclosed apparatus may include an EDM controller in electrical communication with each electrode 24, and a programmable logic controller.

I claim:

1. An apparatus for drilling holes in workpieces by electrical discharge machining comprising:
    an indexable table having an upwardly extending skirt disposed around a perimeter of said table to contain dielectric fluid and eliminate fluid leakage;
    a rigid, vertical frame which straddles the table;
    a slide member cooperatively attached to the frame so that it may move in relation thereto, thereby facilitating advancement and retraction of heads to and from a workpiece;
    a plurality of advancable and retractable heads associated with the slide member that are adapted for electrical discharge machining, each head being adjustably inclinable in a plane which lies parallel to the slide member so that travel time required by associated electrodes is reduced, thereby increasing machine speed, each head including:
    a rotatable, hollow electrode defining an axially extending channel, each said electrode being securable in relation to the associated head; and
    means for delivering a dielectric fluid through said channel so that machining debris may be transported away from the workpiece.

2. An apparatus for drilling holes in workpieces by electrical discharge machining comprising:
    an indexable table;
    a rigid, vertical frame which straddles the table;
    a slide member cooperatively attached to the frame so that it may move in relation thereto;
    a plurality of advancable and retractable heads associated with the slide member that are adapted for electrical discharge machining, each head being adjustably inclinable in a plane which lines parallel to the slide member, each head including:

a rotatable, hole electrode defining an axially extending channel, each said electrode being securable in relation to the associated head; and means for delivering a dielectric fluid through said channel so that machining debris may be transported away from the workpiece, the apparatus also including:

a base to which the frame is rigidly secured;

an index lock attached to the base; and at least one indexing block mounted upon the indexable table, each said at least one block being engageable with the indexing lock so that the table is precisely located in relation to the frame.

3. The apparatus of claim 2, wherein there are four indexing blocks equidistally mounted around a periphery of the table.

4. The apparatus of claim 3 further including means for flexibly grounding electrically connected to the index lock.

5. The apparatus of claim 1, wherein the means for delivering a dielectric fluid comprises:

a reservoir containing the fluid;

a deionizer in fluid communication therewith; and one or more pressure pumps for delivering the fluid to the plurality of advancable and retractable heads.

6. The apparatus of claim 5 further comprising three high pressure devices for delivering the fluid to the axially extending channel of each rotating electrode.

7. The apparatus of claim 6, further comprising three low pressure devices for delivering dielectric fluid so that a workpiece surface is irrigated to assist in removal of machining debris.

8. A method for drilling holes in a workpiece by electric discharge machining comprising:

loading and orienting a workpiece at a work station;

simultaneously drilling by electrical discharge machining a hole at other stations disposed peripherly around an indexable table;

raising a slide member so that a clearance is provided between a rotating electrode and the associated workpiece;

rotating the indexable table so that a workpiece may advance to a subsequent station; and repeating the above steps as often as desired.

9. The method of claim 8, wherein the EDM drilling step is accomplished at a feed rate of about 2 inches per minute under a DC open voltage in the range of 130-140 volts, which supplies a maximum current of about 20 amps delivered for about 10 micro seconds.

10. The method of claim 9, wherein the current passing through the rotating electrode is between 13-16 amps.

11. The method of claim 10 further comprising providing a channel of about 0.1-0.15 mm extending axially through an electrode having an outer diameter of between 1.0-1.2 mm.

12. The method of claim 11, wherein a hole generated in the workpiece is approximately 0.05 mm larger in cross section than the electrode.

* * * * *